United States Patent [19]

Ikedo et al.

[11] 3,975,637

[45] Aug. 17, 1976

[54] DEVICE FOR STORAGE AND DISPLAY OF A RADIATION IMAGE

[75] Inventors: Masaru Ikedo, Neyagawa; Yoshitake Yasuno, Kyoto; Tadaoki Yamashita, Hirakata, all of Japan

[73] Assignee: Matsushita Electric Industrial Co., Ltd., Osaka, Japan

[22] Filed: Oct. 23, 1974

[21] Appl. No.: 517,438

[30] Foreign Application Priority Data

Oct. 23, 1973  Japan............................. 48-119598
Sept. 6, 1974  Japan............................. 49-103201

[52] U.S. Cl.............................. 250/327; 250/330; 250/337; 250/484
[51] Int. Cl.²........................ G03C 5/17; G01T 1/11
[58] Field of Search .......... 250/337, 484, 333, 330, 250/327

[56] References Cited
UNITED STATES PATENTS

| | | |
|---|---|---|
| 2,742,631 | 4/1956 | Rajchman et al................ 250/337 X |
| 3,453,436 | 7/1969 | Nail ................................. 250/484 X |
| 3,729,630 | 4/1973 | Yamashita et al................. 250/337 |
| 3,800,142 | 3/1974 | Harshaw ............................ 250/337 |
| 3,859,527 | 1/1975 | Luckey .......................... 250/337 X |

*Primary Examiner*—Archie R. Borchelt
*Attorney, Agent, or Firm*—Wenderoth, Lind & Ponack

[57] ABSTRACT

A thin layer of thermoluminescent material is formed on a substrate to form an image storage panel. A radiation image is projected onto the panel, and is stored by the thermoluminescent material.

For reading, the panel is scanned by an infrared laser beam, and thermoluminescence proportional to the dose is emitted at the point of impingement of the laser beam. By scanning the storage panel with the laser beam, and by detecting the thermoluminescence, a series of emissions is obtained in the form of a video signal which is used to drive a display device.

4 Claims, 8 Drawing Figures

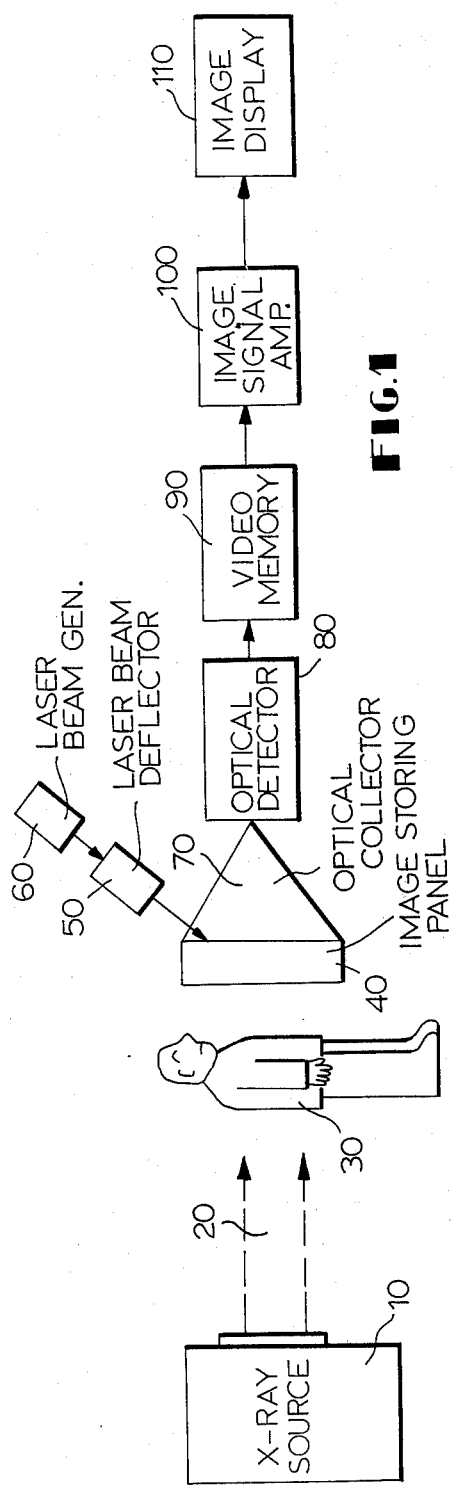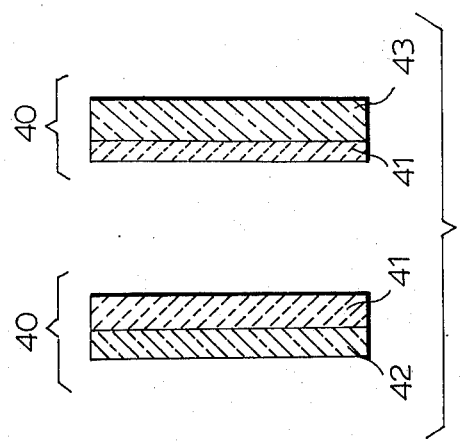

DEVICE FOR STORAGE AND DISPLAY OF A RADIATION IMAGE

BACKGROUND OF THE INVENTION

1. Field of the Invention

This invention relates to an instrument for handling a radiation image and more particularly to an instrument for storing and displaying a radiation image.

2. Description of the Prior Art

Techniques of handling radiation images are becoming more and more important today. More particularly, observation of an X-ray image is very important in the field of medical diagnosis.

Up to this time, there have been used a radio-photographic instrument or an X-ray television set for displaying radiation images. But the radiation dose to which a human body can be exposed at one time is 300 to 400 mrem with commercially available instruments. Because a radiation dose of a high level harms man, it is desirable that the radiation dose used in radiography be as low as possible.

SUMMARY OF THE INVENTION

OBJECT OF THE INVENTION

It is therefore an object of this invention to provide a very sensitive instrument for radiography by using thermoluminescence for storing a radiation image.

The particular feature of the invention is to use thermoluminescent material for storing a radiation image. Another particular feature of the invention is to heat a layer of thermoluminescent material by scanning with a laser beam.

Other features and advantageous of the invention will be apparent from the following description taken in connection with the accompanying drawings.

BRIEF DESCRIPTION OF THE DRAWINGS

FIG. 1 is a basic block diagram of a device for storage and display of a radiation image according to the invention;

FIG. 2 is a side sectional view of two image storage panels;

DESCRIPTION OF THE PREFERRED EMBODIMENT

Figure 3:
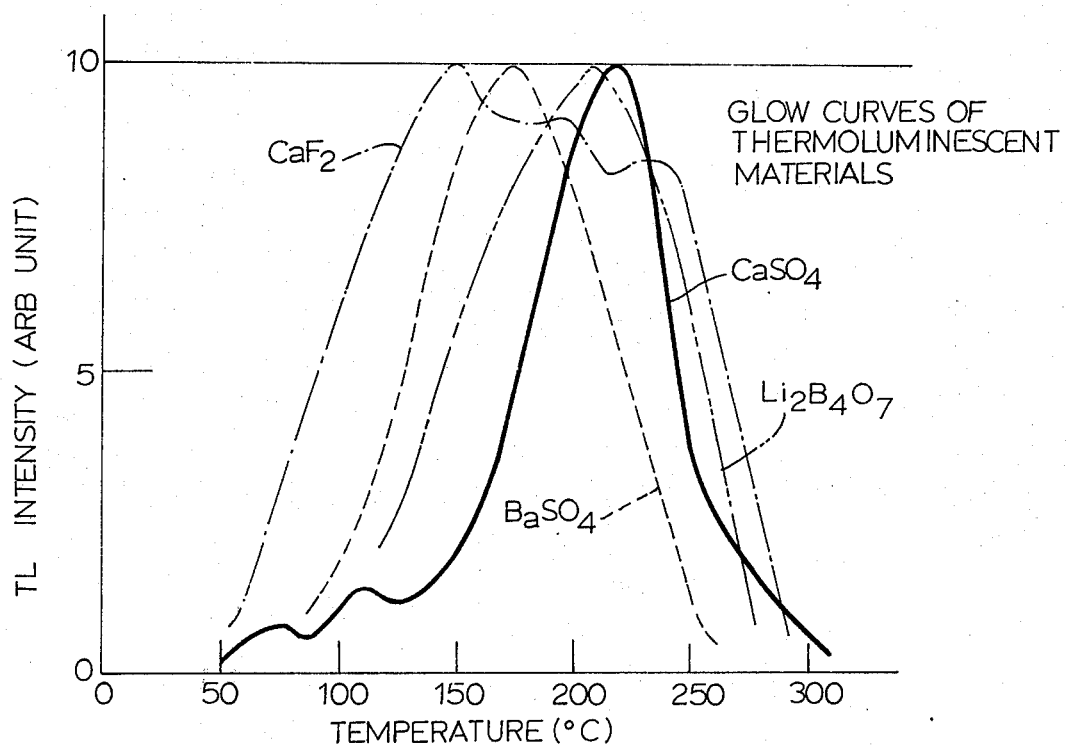
FIG. 3 is a graph of glow curves of thermoluminescent materials.

Referring first to FIG. 1, numeral 10 designates an X-ray source emitting an X-ray beam toward matter 30 to be examined. A laser beam generator 60 directs a laser beam through a deflector 5 and onto an image storage panel 40 composed of a thin layer of thermoluminescent material formed of a substrate. An optical collector 70 collects the emissions from storage panel 40 and supplies them to an optical detector 80 which feeds them to a video memory device 90. An image signal amplifier 100 amplifies the signal from the memory device 90 and feeds it to an image display 110.

The operation of the apparatus of this invention is as follows:

X-ray beams 20, generated by X-ray source 10 pass through the matter 30, and an X-ray image, formed by passing through the matter, is projected onto image storing panel 40. The thermoluminescent material of the panel absorbs some part of the radiation energy and stores it as an absorbed dose. Thus, the dose is distributed according to the distribution of the X-ray intensity of the original image over the surface of the thermoluminescent image storing panel 40.

Next, the thermoluminescent image storing panel is heated by scanning the thermoluminescent image storing panel 40 with a laser beam. At the point at which the laser beam impinges on the thermoluminescent image storing panel 40, the thermoluminescent material is heated by the laser beam and emits thermoluminescence. This thermoluminescence is collected by the optical collector 70 and detected by the optical detector 80. Thus, a series of emissions of different light intensity is obtained as a video signal finally to drive the display device 110. There will now be described details of each part.

FIG. 2 is a sectional view of two thermoluminescent image storing panels. Referring to FIG. 2, numeral 41 designates a thermoluminescent material, 42 an opaque substrate, and 43 a transparent substrate. Thus, one thermoluminescent image storing panel 40 is composed of a thin layer of thermoluminescent material 41 formed on a transparent substrate 42 and the other is formed of a thin layer of thermoluminescent material 41 on an opaque substrate 43. The thickness of said layer of thermoluminescent material determines the resolving power and sensitivity of this panel; that is, the smaller said thickness, the better the resolving power but the lesser the sensitivity. The optimum thickness is from 5 $\mu$ to 200 $\mu$ depending on what kind of information is needed from the radiation image. In the embodiments shown, the thickness of said layer of thermoluminescent material is 50 $\mu$.

Figure 4:
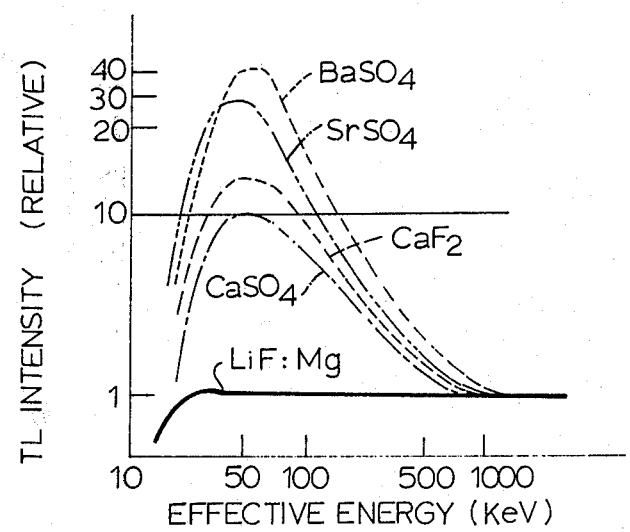
FIG. 4 is a graph of energy-response curves of thermoluminescent materials.

There are two properties which the thermoluminescent material must have for this type of application. First, it is desirable that the temperature of the glow peak of the thermoluminescent material be in a temperature range between 60° and 300°C, because glow peaks at a temperature less than 60°C cause the image to fade rapidly at room temperature, and because it becomes difficult to heat the panel sufficiently if the temperature of the glow peak is more than 300°C. Glow curves of some thermoluminescent materials are shown in FIG. 3, and the temperature of the glow peaks are shown on the abscissa. FIG. 4 shows energy-thermoluminescence response curves of thermoluminescent materials. Another important property of thermoluminescent material which is for a thermolumine panel is sensitivity, which is defined as thermoluminescence intensity per unit of radiation exposure. Usually, the sensitivity of a thermoluminescent material is estimated for radiation the energy of which is about 1000 keV, but in many materials, it depends on the effective energy of the radiation. This situation is shown in FIG. 4. As shown in this Figure, materials composed of heavy atoms show much higher sensitivity at 50 keV than at 1000 keV. Considering that, in medical diagnosis, the effective energy of the X-ray used most is between 20 keV and 150 keV, sensitivity at 50 keV is important as well as sensitivity at 1000 keV. Taking into account the glow peak temperature and relative sensitivities of various material at both 50 keV and 1000 keV, the following material have been found to be suitable for use in the thermoluminescent panel; $Na_2SO_4$, $MgSO_4$, $CaSO_4$, $SrSO_4$, $BaSO_4$, $Y_2O_3$—$Al_2O_3$, $MgB_4O_7$, $Li_2B_4O_7$, $Mg_2SiO_4$, $Al_2O_3$, $CaF_2$, $SrF_2$ and $BaF_2$.

Figure 5:
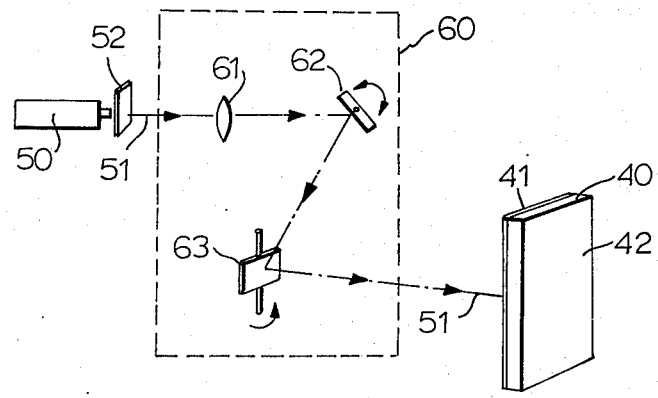
FIG. 5 is a schematic representation of a laser beam deflector used in a embodiment of this invention.

FIG. 5 shows the construction of a laser beam deflector. In this figure, number 50 designates the laser beam source, 51 a laser beam, 40 the image storing panel, and 52 a visible light filter, 61 a lens, and horizontally and vertically pivoted scanning mirrors 62 and 63. The parts are positioned for the laser beam to pass through the visible light filter 52 and lens 61 and to be reflected by the scanning mirror 62 and then by the scanning mirror 63 and finally to arrive at the image storing panel 40.

Figure 6:
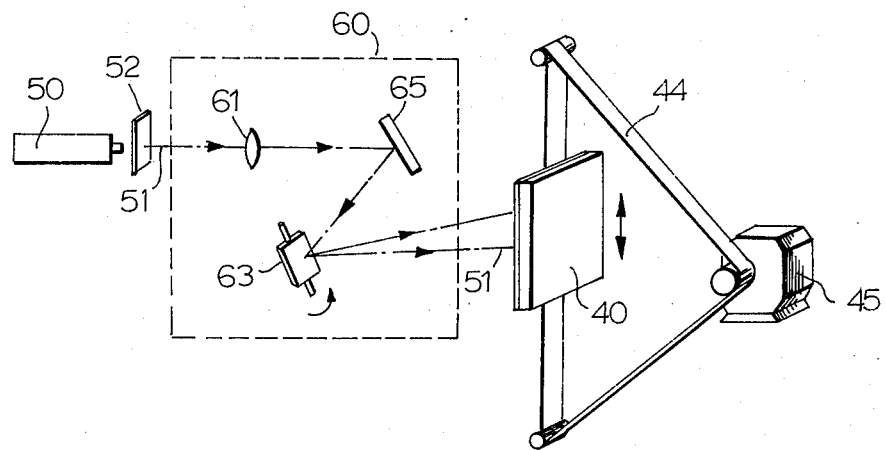
FIG. 6 is a schematic representation of a laser beam deflector and a panel driving device used in another embodiment of this invention.

The visible light filter 52 is made of a material which can transmit infrared light but not visible light. Silicon, for example, is one such a material. The lens 61 is provided to focus the laser beam to a diameter less than $50\mu m$ on the surface of the image storing panel. Each scanning mirror is driven by a driving means (not shown) so as to oscillate around its own axis. Scanning mirror 62 acts as a vertical deflector. Scanning mirror 63 is a horizontal deflector. The oscillation frequency of the scanning mirrors 62 and 63 are 0.2 Hz and 360 Hz respectively, so that the image storing panel 40 is scanned by the laser beam in 5 seconds. FIG. 6 shows an arrangement of a laser beam deflector and a panel driving mechanism used in another embodiment of this invention. Referring to FIG. 6, numeral 44 designates a belt, 45 a motor to drive the image storing panel 40, and 65 a fixed mirror. Oscillating scanning mirror 63 acts as a horizontal deflector as described in connection with FIG. 5. The image storing panel 40 is driven by the motor 45 up and down in the vertical direction.

Figure 7:
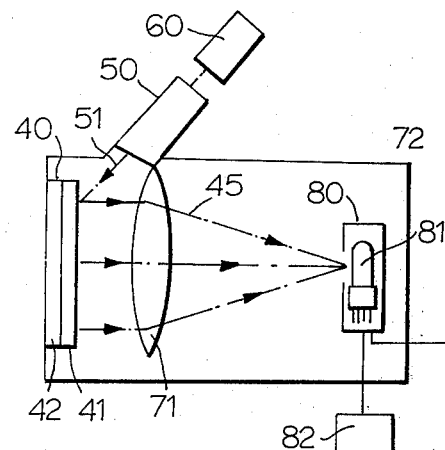
FIG. 7 is a diagram of an arrangement of an image storage panel, a light collector and an optical detector.

FIG. 7 shows an arrangement of the image storing panel 40, the light collection 71 and the optical detector 80. Referring to FIG. 7, numeral 40 designates an image storing panel 30 cm × 30 cm in size, 41 a thermoluminescent material layer, 42 a substrate made of, for example, aluminium or plastic, 45 the thermoluminescent emission, 71 a lens acting as a light collector, 80 an optical detector, 72 a dark box which shuts out external light, and 81 a photomultiplier.

Thermoluminescence, which is emitted when the surface of thermoluminescent layer 41 is heated, is focused by lens 71 on the light detector 80. The light signal is converted an electrical signal by the optical detector and is recorded by an image recording device 90. In this embodiments, a photomultiplier 81 applied with power from power supply 82 is used as the optical detector.

Figure 8:
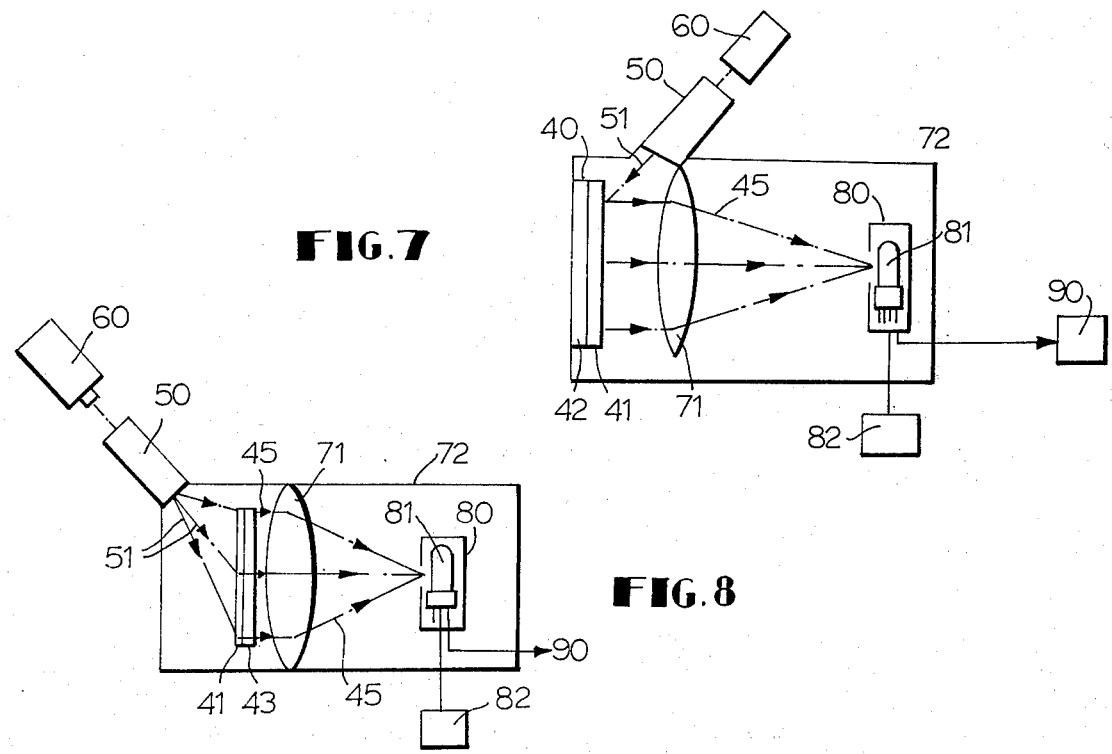
FIG. 8 is a diagram of another arrangement of an image storage panel, a light collector and a light detector.

FIG. 8 shows another arrangement of the image storing panel, light collector and optical detector. Referring to FIG. 8, numeral designates a transparent substrate, for example, quartz glass or transparent plastic. Thermoluminescent emissions 45 pass from layer 41 through the substrate and are concentrated by lens 71 on photomultiplier 81. The spectral sensitivity of photomultiplier is required to be such that it is sensitive to both ultraviolet light and visible light. Model 1P21 photomultiplier of HAMAMATSU TV meets this specification.

In the method of preparation of the thermoluminescent image storing panel 40, thermoluminescent material powder having a gram size of from 1 to 100 micro meters in diameter is used. For forming this powder material into a thermoluminescent layer a spraying or brushing step can be used.

An example of forming the panel is as follows: 100 gm of $CaSO_4$ is mixed with 100 gm of diluted siloxane resin. The diluent is tolene. The mixed liquid is sprayed upon the substrate with a spray gun. The thickness of the layer formed is $50\mu m$. The deviation of the thickness of the layer must be less than 10%. The layer of the thermoluminescent material is dried for 1 hour at room temperature, is heated at 150°C for 2 hours, and then is heated at 400°C for 1 hour. This method can be used to make panels from other thermoluminescent materials.

Details of the preferred embodiments have been described. The embodiment of the device for storage and display of an X-ray image which uses $CaSO_4$ as the thermoluminescent material on the image storing panel has the ability of obtaining an X-ray image by irradiating with as low a dosage as 5 mR. With this instrument, a radiation image can easily be obtained by using X-rays only one twentieth the intensity of the X-rays of a commercial radiography instrument available today.

What is claimed is:

1. An instrument for storage and display of a radiation image comprising; an image storing panel for receiving electro magnetic radiation which passes through matter to be examined and storing the X-rays in a pattern of intensities proportional to the intensities in the radiation image, the image storing panel being composed of a layer of thermoluminscent material on a substrate, the thermoluminescent material having at least one glow peak in temperature range of from 60° to 300°C; a laser beam source directed toward said panel for heating the panel; focusing means in the path of the laser beam for focusing the laser beam; scanning means in the path of the laser beam for causing the laser beam to scan the image storing panel; a visible filter in the path of the laser beam for filtering visible light from the laser beam so that the laser beam is composed of infrared light but not visible light; and means positioned relative to the panel for detecting the thermoluminescent emissions from the panel as a series of light signals.

2. An instrument as claimed in claim 1, in which said thermoluminescent material layer comprises at least one of the materials taken from the group consisting of $Na_2SO_4$, $MgSO_4$, $CaSO_4$, $SrSO_4$, $BaSO_4$, $Y_2O_3$—$Al_2O_3$, $MgB_4O_7$, $Li_2B_4O_7$, $Mg_2SiO_4$, $Al_2O_3$, $CaF_2$, $SrF_2$ and $BaF_2$.

3. An instrument as claimed in claim 1, in which the thickness of said thermoluminescent material is from 5 to 200 Micro meters.

4. An instrument as claimed in claim 1, in which said thermoluminescent material layer comprises at least one of the materials taken from the group consisting of, $Na_2SO_4$, $MgSO_4$, $CaSO_4$, $SrSO_4$, $BaSO_4$, $Y_2O_3$—$Al_2O_3$, $MgB_4O_7$, $Li_2B_4O_7$, $Mg_2SiO_4$, $Al_2O_3$, $CaF_2$, $SrF_2$, $BaF_2$, and a binder of siloxane.

* * * * *